United States Patent
Paul

[19]

[11] Patent Number: 5,851,386
[45] Date of Patent: Dec. 22, 1998

[54] WASTE-OIL CLEANING APPARATUS

[76] Inventor: Christopher G. Paul, P.O. Box 71455, Fairbanks, Ak. 99707

[21] Appl. No.: 896,828

[22] Filed: Jul. 18, 1997

Related U.S. Application Data

[62] Division of Ser. No. 698,374, Aug. 15, 1996, Pat. No. 5,676,840.

[51] Int. Cl.$^6$ .......................... B01D 35/06; B01D 21/26; B01D 35/18
[52] U.S. Cl. ......................... 210/183; 210/184; 210/186; 210/187; 210/195.1; 210/196; 210/197; 210/223; 210/295; 210/299; 210/312; 210/313; 210/360.1; 210/532.1
[58] Field of Search .................................... 210/168, 175, 210/182, 183, 184, 186, 195.1, 187, 197, 258, 222, 223, 259, 294, 295, 299, 312, 313, 360.1, 532.1, 923

[56] References Cited

U.S. PATENT DOCUMENTS 3,954,611  5/1976  Reedy .
4,202,778  5/1980  Middlebeek ......................... 210/532.1
4,501,671  2/1985  Bazell .

*Primary Examiner*—David A. Reifsnyder
*Attorney, Agent, or Firm*—R. Russel Austin

[57] ABSTRACT

A waste-oil cleaning apparatus includes a processing tank for holding waste-oil, and arranged such that non-oil liquids in the waste-oil settle in the base of the tank. A conduit and valve arrangement is provided for withdrawing the settled non-oil liquids from the base of the tank. The apparatus also incorporates an oil cleaning unit including a pump, a mesh filter and a centrifuge. Waste oil in the tank is cleaned by pumping oil out of the tank and passing the oil sequentially through the mesh filter and the centrifuge after the settled non-oil liquids are withdrawn from the base of the tank.

8 Claims, 5 Drawing Sheets

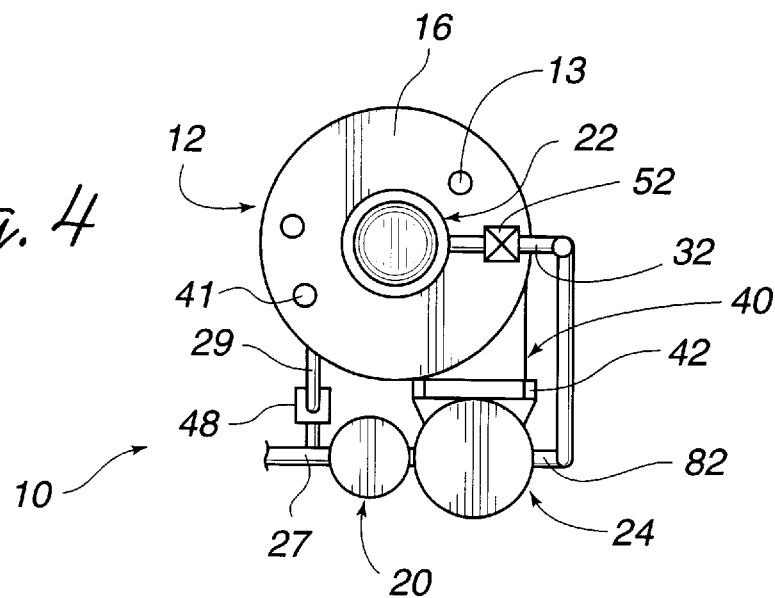
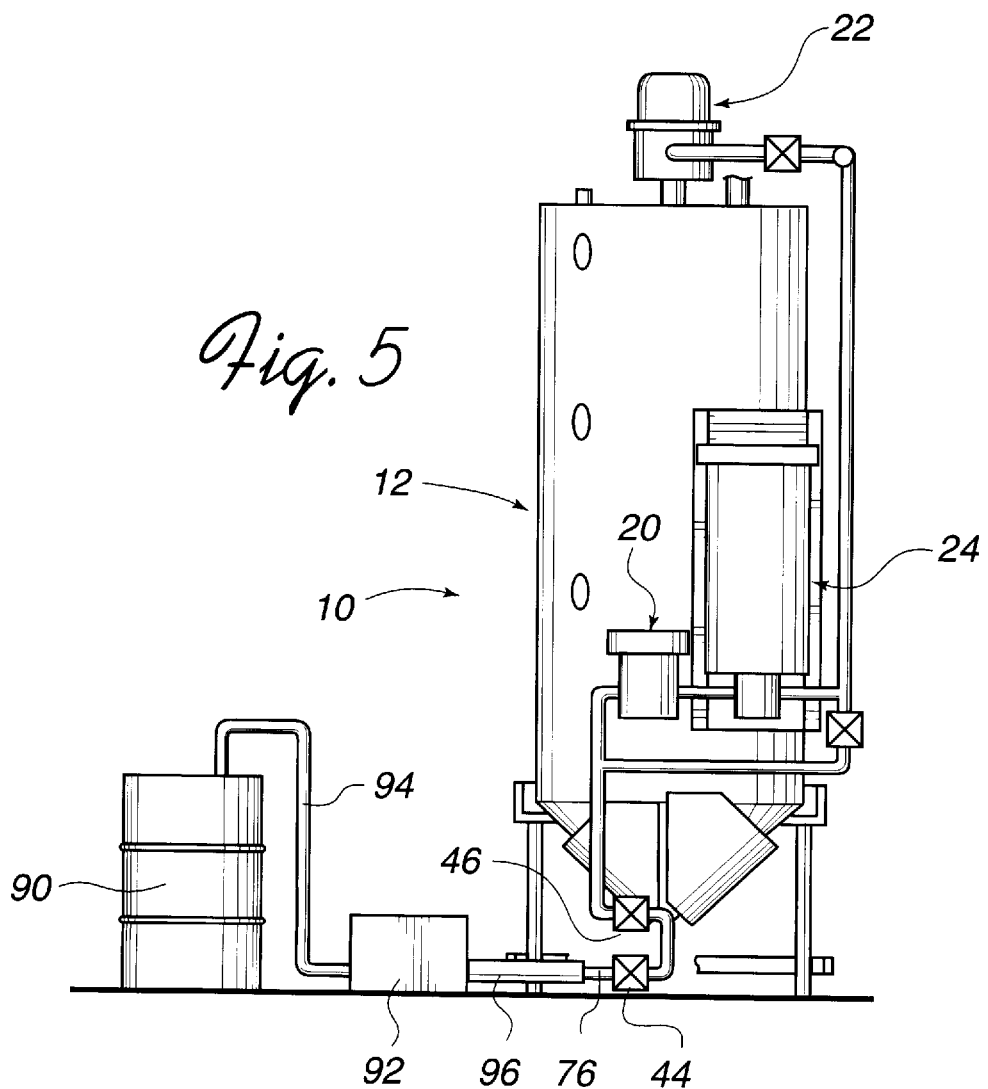

WASTE-OIL CLEANING APPARATUS

REFERENCE TO PRIOR APPLICATIONS

This application is a divisional application of application Ser. No. 08/698,374, filed Aug. 15, 1996 now U.S. Pat. No. 5,676,840.

TECHNICAL FIELD OF THE INVENTION

The present invention relates generally to recovery of useable oil from waste-oil including water, glycol, and solid particulates. The invention relates in particular to a waste-oil cleaning apparatus in which water and glycol are first separated from the waste-oil and the remaining oil is then subjected to repeated filtering and centrifuging to remove particulates.

BACKGROUND OF THE INVENTION

In remote areas of the world, which have a significant population, but lack the infrastructure enjoyed by more heavily populated regions, environmentally safe disposal of waste materials presents a significant problem. One family of such waste materials are waste-oils (used-oils) from internal combustion engines. These waste-oils include engine-oils, transmission-fluids, and other lubricants.

In order to protect the environment, the United States of America and other nations have adopted strict laws regulating the use storage and disposal of such products. In remote regions, compliance with such regulations can be very expensive. Typically waste-oils are stored in steel drums. Without a benign storage environment, however, such drums, can quickly corrode and pose the problem of dealing with oil leakage and seepage. Providing a benign storage environment is expensive. The cost of shipping a drum of waste-oil from a remote area to a facility wherein it can be recycled or safely disposed of, can be several times more than the cost of the original oil.

One method of disposal of waste-oil, at or near a site at which it is generated, is by incineration of the waste-oil in what is commonly termed a "waste-oil furnace". This incineration has the advantage of providing a heat source for buildings or industrial processes, which is particularly beneficial if the remote area has a cold climate.

There are several manufacturers of waste-oil furnaces who have endeavored to provide a waste-oil furnace which is dependable, efficient and environmentally friendly. Most such furnaces are capable of burning a wide range of oils, including lubricating oils of up to 60-weight, transmission oils, certain types of synthetic oils, as well as number-one and number-two heating oils. Usually, however, such furnaces fail to provide dependability over extended periods of use. Failure of a waste-oil furnace during use is usually traceable to contaminant content of the waste-oils that are combusted in the furnace. Examples of such contaminants and reasons for their existence in waste-oil are set forth below.

Metal particles (usually of iron or steel) are invariably present in waste lubricating and transmission oils. Such particles result from abrasion of components such as cylinder-walls, pistons, and gears. In oil from an engine which has undergone some form of catastrophic failure, metal fragments in addition to particles may be found. Metal particles and fragments may also be introduced by drums in which waste-oil is stored. These typically comprise metal cutting or welding residues resulting from the drum fabrication. Metal oxide particles, rust and the like may be present in oil which is stored in drums which have been allowed to corrode.

Apart from the above-described metal particles, contaminant materials including rubber, paint-flakes or chips, sand, cork, paper, silt, rags, rope, and gasket materials are also often found in waste-oil. Reasons for the existence of such contaminants may be many fold.

Water, glycol (antifreeze) and like non-oil fluids may be present in stored waste-oil. These may have been introduced into the oil, during its use period, as a result of leakage through cylinder-head gaskets. Such fluids may also be introduced from leakage into outside-stored barrels from rain, or from snow melt. These fluids may also be present through careless or willful dumping of antifreeze into storage drums or waste pans.

Finally, but not exhaustively, stored waste-oil may contain algae. Certain types of algae can grow at an oil/water interface. Such an interface may be present as a result of settling or separation of water and non-oil fluids in a storage drum. Such algae contribute to formation of what is usually termed "sludge" in the stored oil.

There are several effects of above described contaminants on waste-oil furnace operation. Solid materials and particles, of any kind, plug any filtering screens in the furnace, as well as causing rapid wear of fuel pump surfaces. Ferrous metal particles build up in magnetic solenoid valves in the furnace causing rapid failure of such valves. Water and anti-freeze are not combustible and thus contribute to erratic and inefficient burning of fuel. This leads to low flame temperatures in the furnace, which in turn leads to build up of soot and other residues. Water also causes corrosion of components, such as gears, in the fuel pump mechanism of the waste-oil furnace, as well as promoting formation of sludge and algae growth.

Described above are but several examples of problems associated with burning contaminated waste-oil in a waste-oil furnace. These problems may be so severe that a waste-oil furnace may require daily maintenance, reducing its useful duty time to fifty to eighty percent of a service day. Such a limited duty cycle can be a particular problem in very cold remote regions, such as are found, for example, in the state of Alaska. Without such time-consuming attention, however, it is estimated that a waste-oil furnace burning heavily contaminated waste-oil may experience catastrophic failure within as few as two days of operation.

SUMMARY OF THE INVENTION

The present invention is directed to providing a simple and inexpensive apparatus for cleaning waste-oil, or used-oil, to provide a combustible fuel-oil which can be burned in a waste-oil furnace without requiring that the furnace be frequently maintained, and without causing rapid wear of critical furnace components.

In one preferred embodiment of the present invention, apparatus for recovering combustible oil from waste-oil including liquid and solid contaminants, comprises a tank having a base and a top and means for admitting waste-oil to be recovered into said tank. An arrangement is provided for heating waste-oil in said tank;

Means are provided at the base of said tank for withdrawing therefrom any non-oil fluids which settle from waste-oil in the tank. Oil cleaning means are provided outside of said tank for removing particulate material from oil circulated therethrough. The oil cleaning means includes a mesh filter and a centrifuge arranged to separate only solids from waste-oil circulated therethrough. A pump is provided for extracting oil from said tank, circulating the oil through the cleaning means, and returning filtered and centrifuged oil to the tank.

A method of operating the apparatus comprises at least partially filling the tank with the waste-oil, heating the waste oil to a temperature of about eighty degrees Fahrenheit, then holding the waste-oil in the tank for a time period sufficient that non-oil liquid contaminants, such as water and glycol, in the waste-oil settle at the base of the tank. After this holding or settling period, the liquid contaminants are then withdrawn from the base of the tank, leaving partially recovered combustible oil therein.

Next, partially recovered fuel oil is extracted from the tank, passed through filter and a centrifuge, and returned to the tank. This extraction and passing through the filter and centrifuge is continued until oil in the tank is substantially free of particulate contaminants. The cleaned or recovered oil may then extracted from the tank for use as fuel oil. Preferably a pump is used to continually extract oil from a point near the base of the tank, draw the extracted oil sequence through the mesh filter and the centrifuge, and push the oil through the centrifuge, the centrifuge discharging and returning the oil into the tank at a point on or near the top of the tank, and preferably above the level of oil in the tank.

It should be noted here that the above comments concerning heating of the oil are directed to those cases where the apparatus of the present invention is operated in cold climates and is housed outside of comfortably heated living space. Waste-oil furnaces are found in use primarily in regions having a cold climate. It will be evident to one familiar with the art to which the present invention pertains, that if the apparatus of the present invention is located in a very hot climate, or in a more than comfortably heated enclosure, the above-discussed heating steps may be dispensed with and oil maintained at a temperature greater than 80° F. by ambient conditions.

No representation is made that the oil cleaning apparatus of the present invention is capable of absolutely and completely removing all liquid and solid contaminants from waste oil. However, removal of these contaminants has been found to be sufficiently substantial that combustible oil recovered by the method from several waste-oil sources has been burned in a waste-oil furnace for a period in excess of six months without the furnace requiring any maintenance.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 4 is a partial plan view, schematically illustrating the apparatus of FIG. 2, seen from above.

FIG. 5 is an elevation view schematically illustrating the apparatus of FIG. 2 connected via a pump to a waste oil storage drum for pumping oil into the process tank.

DETAILED DESCRIPTION OF THE INVENTION

Figure 2:
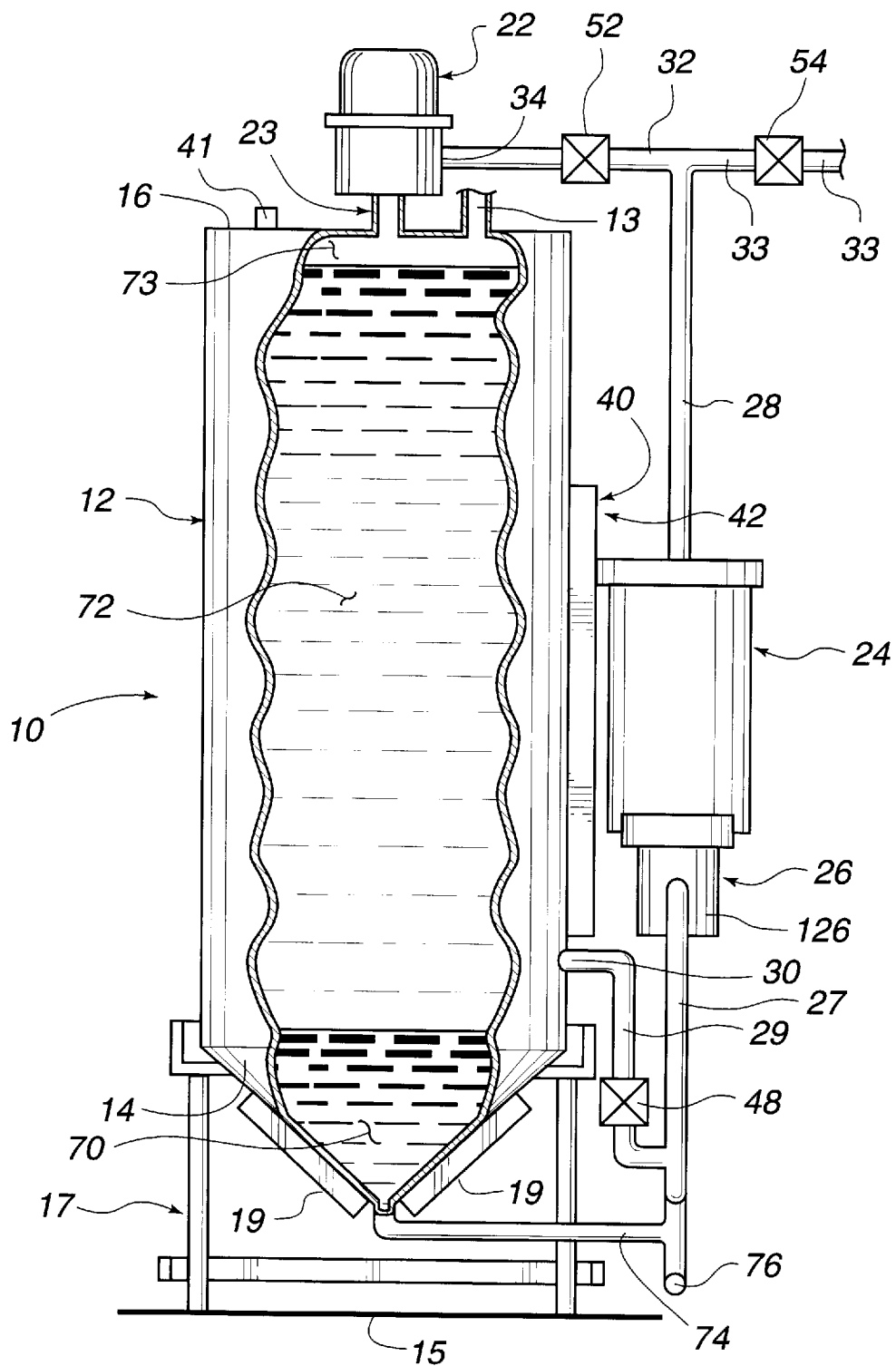
FIG. 2 is a partially cut-away elevation view schematically illustrating a preferred apparatus, including a process tank, a mesh filter and a centrifuge, for carrying out the oil cleaning method of FIG. 1.
Figure 3:
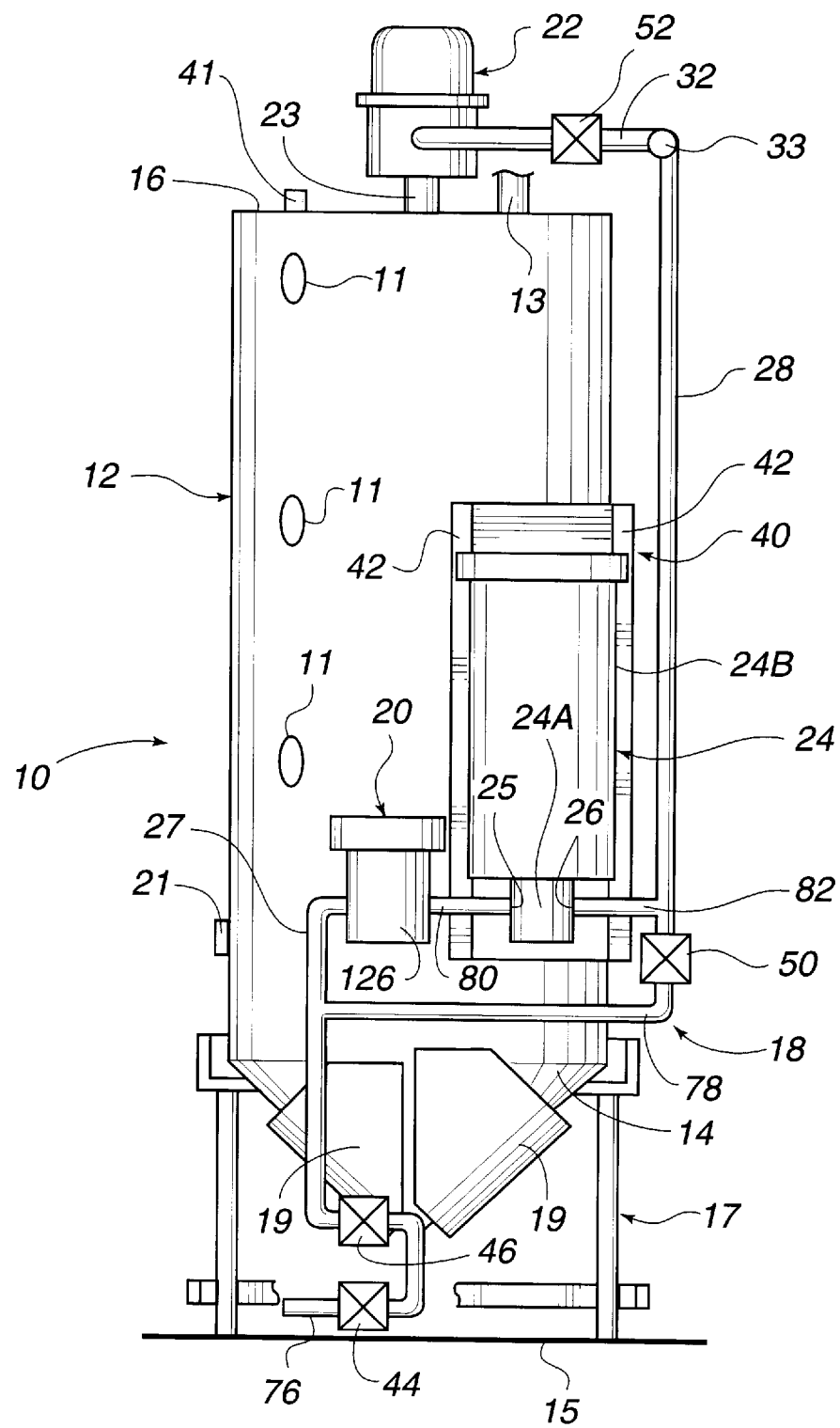
FIG. 3 is another elevation view of the apparatus of FIG. 2 seen generally in the direction 3—3 of FIG. 2 and illustrating an oil cleaning circuit including a pump, a mesh filter and a centrifuge.

Turning now to the drawings, wherein like components are designated by like reference numerals, FIG. 2, FIG. 3, and FIG. 4 illustrate details of a preferred form 10 of apparatus suitable for carrying out an oil cleaning method in accordance with the present invention. Apparatus 10 includes an elongated processing tank 12 having a cylindrical form. Sight-ports 11 are provided to allow the level of oil in the tank to be estimated.

Tank 12 has a tapered or funnel-shaped base 14, and a closed top 16. Tank 12 is equipped with a vent 13. Vent 13 is preferably vented to the outside of any building in which apparatus 10 is located, and at a suitable height above the building. Such a height would typically be stipulated by a local building code. In apparatus 10, tank 12 preferably has a capacity of about two-hundred-sixty gallons. This provides for about five to six days continuous operation of a 350,000 British Thermal Unit (BTU) waste-oil furnace. Tank 12 is supported above floor 15 by a skeletal support-frame 17 which allows access to base 14 of tank 12 for connection of conduits and other components thereto.

Heating elements 19, are applied to base 14 of tank 12 for heating waste-oil contained therein. One preferred such heating element is a silicone rubber heating pad manufactured by the Watlow Corporation, of St Louis, Mo. Such a pad is sufficiently flexible to conform to the curvature of base 14 of tank 12. Such a pad is easily installed by bonding the pad to the base with a silicone adhesive. Heating elements 19 are preferably thermostatically controlled to keep oil in tank 12 in a desired temperature range. This is accomplished by a thermostat 21 and suitable switches (not shown).

A manifold system 18 of conduits provide means for introducing waste-oil into the tank, extracting oil from the tank, and passing or circulating extracted oil from the tank through a cleaning system including a mesh filter 20 and a centrifuge 22.

A pump 24 provides negative pressure for extracting oil from tank 12 and drawing the oil through filter 20. Pump 24 is an electric-motor driven pump including a pump mechanism portion 24A and an electric-motor drive portion 24B for driving the mechanism. Pump 24 provides positive pressure for pushing or forcing filtered, extracted oil through centrifuge 22. Pump 24 is preferably a SERIES G475 rotary vane pump manufactured by Viking Pump, of Cedar Falls, Iowa. Such a pump can provide a flow rate of about seven gallons per minute (7 gpm) at a pressure of about ninety pounds per square inch (90 psi). The pump is preferably mounted on tank 12 by means of a bracket 40 including mounting rails 42.

Specifically, pump 24 is preferably operated with suction side 25 thereof in fluid communication via filter 20, conduit 27, and conduit 29 with a port 30 proximate base 14 of tank 12. Pump 24 is operated with discharge side 26 thereof in fluid communication via conduits 28 and 32 with input port 34 of centrifuge 22.

Centrifuge 22 is preferably a jet-type centrifuge which includes a turbine (not shown) driven by the pressure of input fluids escaping from jets, here, the fluids are the waste-oil. Such a centrifuge does not require a separate driving motor. It is emphasized here that the purpose not to separate water from oil circulating therethrough but to separate solids from the circulating oil. The centrifuge has only one outlet or discharge port 23 for discharging fluids. Extracted solids collect in the body of the centrifuge and are removed periodically.

A preferred centrifuge of this type is a SPINNER II® model manufactured by Glacier Metal Company Limited (UK). Such a centrifuge can operate with adequate efficiency with an input pressure between about 30 psi and 100 psi. Centrifuge 22 is preferably mounted, as illustrated in FIGS. 2, 3, and 4, on top 16 of tank 12 with sole discharge port 23 of the centrifuge arranged to discharge, downward, freely into tank 12 above the level of oil in the tank. A float level switch 41 provides that tank 12 may only be filled with waste-oil to a predetermined maximum level.

The above-described, top-mounting, downward-discharge arrangement provides that there is no back pressure of oil to be overcome by centrifuge 22 on at discharge port 23 thereof. Because of this, and because there are no filter elements between the pump and the centrifuge 22, most of the pressure delivered by pump 24 is used to turn the turbine (not shown) of centrifuge, ensuring that centrifuge 22 operates at maximum possible efficiency. Further, a jet-type centrifuge of the type here described is arranged such that all contaminant matter captured thereby is thrown outward toward the outer wall of the centrifuge leaving a central fluid passage channel unobstructed. This ensures the maximum operating efficiency achieved by the above-described mounting method continues unattenuated throughout a cleaning cycle.

Valves 44, 46, 48, 50, 52, and 54 of conduit system 18, serve to control fluid flow through the conduit system depending on mode of operation of apparatus 10. The specific purpose of each of these valves is discussed below with reference to a preferred operating procedure for apparatus 10.

It should be noted here, that electrical equipment such a switches, transformers and fuseboxes, and the interconnection of such equipment with motor 24 and heating elements 19 has been omitted for clarity. Specification of such equipment would be evident to a commercial electrical practitioner from specifications and instructions supplied with commercially available components of the type described above. Accordingly, a specific description of such equipment is not presented herein.

Items such as float level indicators and emergency vents may be included in tank 12 for safety or convenience. Installation of an explosion relief vent is recommended. As a description of such items is not necessary for understanding principles of the present invention, however, no such description is presented herein.

Continuing now with reference to FIGS. 2 and 3, and additionally to FIGS. 1 and 5, a description of a preferred operating cycle for apparatus 10 is as follows. With valves 54, 52, 50, 48, and 46 closed, and valve 44 open, waste-oil from a storage drum 90 (see FIG. 5) is pumped via a pump 92 into conduit 76 and thus into tank 12. Pump 90 is preferably an air-powered diaphragm-pump, and is connected to conduit 76 via a conduit or hose 96, and to drum 90 via a conduit or hose 94. Drum storage of waste oil is here shown as exemplary. Clearly several such drums would need to be sequentially pumped in order to fill tank 12. Oil may also be pumped from a waste-oil storage tank (not shown) which is larger than tank 12.

Preferably, tank 12 is not completely filled with the waste-oil. Preferably, a space 73 (see FIG. 2) is left at the top of the tank to accommodate expansion of oil in the tank when it is heated. Locating an uppermost one of sight-ports 11 about six inches from the top of tank 12 enables a suitable oil level to be visually determined. Alternatively float level switch 41 may be used to shut off operation of pump 92 when oil in the tank reaches a desired level. In a 260 gallon capacity tank as described above a suitable level is about six inches from the top of the tank. Once tank 12 is filled to the desired level, hose 96 may be disconnected from conduit 76.

Figure 1:
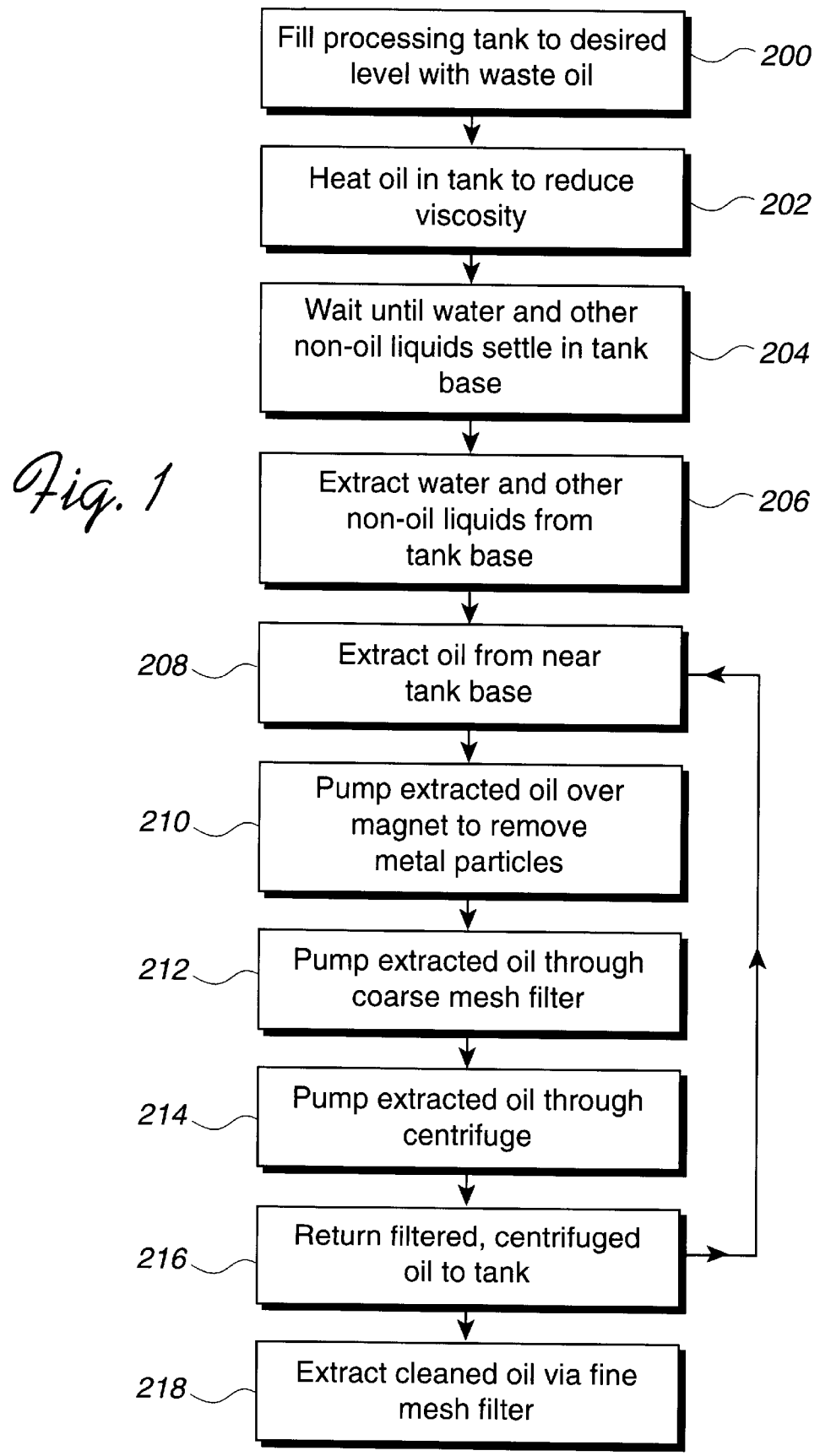
FIG. 1 is a flow chart schematically illustrating a preferred embodiment of an oil cleaning method in accordance with the present invention.

Once tank is 12 filled with the waste-oil to the desired level, (FIG. 1, box 200), heater elements 19 are activated to heat the waste-oil to a temperature sufficient to significantly lower its viscosity (FIG. 1, box 202). As noted above, thermostat controlled switches can provide that the temperature is limited to a value less than 212° F. Heating to a temperature above 212° F. would cause any water contained in the oil to boil. Boiling the contained water would, at a minimum, agitate oil contained in the tank and prevent settling. A preferred viscosity reducing temperature is greater than 80° F. and more preferably between about 100° F. and 120° F.

Oil in tank 12 is held in tank 12 for a time-period of about one-hour at the end of which time-period, liquid contaminants or non-oil fluids such as water and glycol will settle into the base of tank 12 (FIG. 1, box 204) as illustrated in FIG. 2 by hatched region 70. It is not unusual to have about ten to twenty gallons of such fluids settle into the base of tank 12. Partially cleaned or recovered oil, substantially free of non-oil fluids, will float on top of these non-oil fluids as illustrated in FIG. 2 by hatched region 72. Following this settling period, valve 44 is opened to allow non-oil fluids 70 to drain from the base of tank 12 via conduits 74 and 76 (FIG. 1, box 206). Valve 44 is preferably closed immediately partially recovered oil begins to be discharged from conduit 76.

Next, valves 46 and 48 are opened, allowing partially cleaned oil to be driven, by the pressure head of oil in the tank, from the tank into conduits 29, 27, and a by-pass conduit 78. Pump 24 is then activated, preferably with valve 50 initially open and valves 52 and 54 initially closed. This causes a local circulation of oil through by-pass conduit 78 into conduit 27, through filter 20, and through conduits 80 and 82 and back into by-pass conduit 78. This local circulation is continued until all excess air is expelled from these conduits, filter 20 and pump 24.

Once air has been expelled, valve 50 is closed and valve 52 is opened, allowing pump 24 to continually extract partially cleaned oil from the tank, draw this oil through filter 20 and then force the oil via conduits 82, 28, and 32 into centrifuge 22. Oil passed though the centrifuge drives the centrifuge and is discharged into tank 12 via port 23. This extraction of oil from the tank and return of oil to the tank is continued for a period such that the filter and the centrifuge have extracted as many particulates as these devices will allow from the oil in the tank (FIG. 1 boxes 208, 210, 212, 214, and 216).

It is possible that during the filtering and centrifuging period described above, some further settling of relatively small quantity of non-oil fluids (compared with the quantity originally settled) may continue to settle out of oil in tank 12. In this regard, it is preferable to locate port 30 at a sufficient height above the base of the tank that any such settled fluids will not be extracted from the tank together with oil. In a cylindrical tank of the type described above, a suitable position for port 30 is about twelve inches above the funnel-shaped base at its widest point.

At the time of preparing this description, determination of an optimum time period for continuing circulation is determined by simple experiment. It has been found, however, that a period of eight hours is usually sufficient to remove all particulate matter that can be removed by filter 20 and centrifuge 22 from even heavily contaminated waste-oils. Shorter periods my be used with less contaminated waste-oils. Longer periods may be necessary for extremely contaminated waste-oil.

For any particular waste-oil sample it is a simple matter to periodically withdraw oil samples from tank 12 via conduit 76 during filtering and centrifuging and make a visual estimate of the progress of oil cleaning, by either visual inspection or by filtering. Alternatively, one skilled in an appropriate art may devise a "real-time" particle counter which could be installed on apparatus 10 and used to determine when cleaning of the waste-oil was as complete as possible. Such a device, for example, may be an optical device wherein light from a diode-laser is directed into flowing oil, and laser light scattered from the oil is detected and measured as an estimate of particulate content of the oil.

Generally, it can be stated that the purpose of filter 20 is to remove, from the waste-oil, large particulate matter and fragmentary matter, and the purpose of centrifuge 22 is to remove fine particulate matter, for example, particles of about ten microns or less in maximum dimension, and sludge. Normally, a mesh-type filter of about one-hundred mesh would be necessary to remove those particles too large to be effectively removed by centrifuge 22. It was determined, however, that a one-hundred mesh filter and even a forty-mesh filter would become clogged before a batch of waste-oil having a volume equivalent to the capacity of tank 12 could be effectively cleaned. It was determined that a ten-mesh filter was preferable to ensure that apparatus 10 could be effectively operated with even the most contaminated waste-oils encountered.

One filtering method which has been found to be effective in a waste-oil cleaning method in accordance with the present invention is magnetic separation of ferrous metallic particles. Such particles, as noted above, are common and plentiful in waste lubrication oil, and are particularly destructive of solenoid valves and the types of pumps found in waste-oil furnaces.

Figure 6:
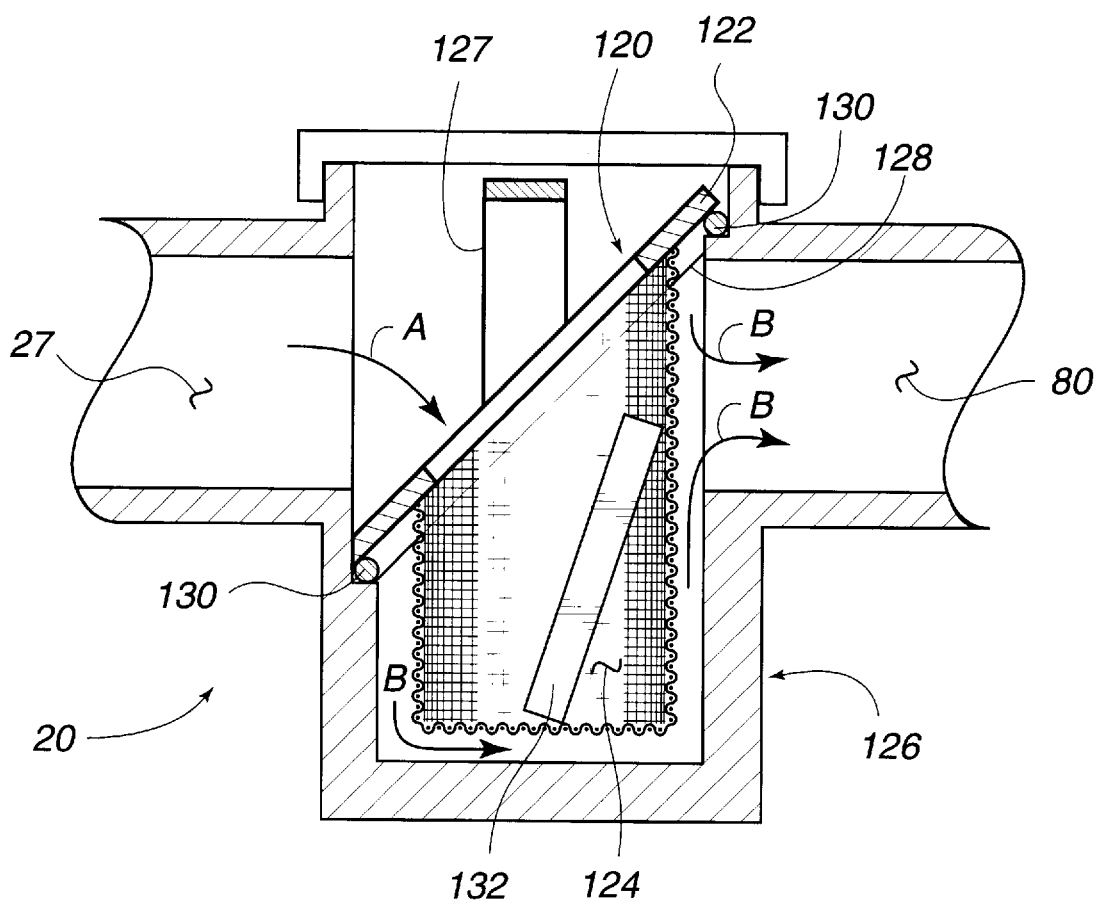
FIG. 6 is a general cross section view schematically illustrating a preferred from of the mesh filter of FIG. 3 including a basket type filter having a permanent magnet located therein.

Referring now to FIG. 6, a particularly effective means of implementing such a magnetic separation process is illustrated. In FIG. 6, the arrangement of a typical basket-type mesh filter, suitable for use as filter 20 is illustrated. Filter 20 includes a filter basket 120 having a sealing-lip 122, a mesh-filter portion 124 and a handle 127. A valve-body 126 includes an angled sealing-shelf 128. Sealing lip 122 of filter basket 120 seals against a sealing shelf 128 assisted by an "O-ring" seal 130.

Oil flow from conduit 27 into the basket, as indicted in FIG. 4 by arrow A, then flows through the basket mesh an into conduit 80 as indicated by arrows B. Located within basket 120 is permanent bar magnet 132, preferably a seventy-pound magnet. Magnet 132 attracts all but the finest ferrous metal particles in oil flowing through the basket. Fine particles which escape attraction are captured by centrifuge 22. It should be noted that the step of heating waste-oil in tank 20 to lower its viscosity for more efficient centrifuging is also important for increasing effectiveness of magnet 132 in attracting ferrous metal particles from the waste-oil.

Continuing now with a description of the operation of apparatus 10, once particle removal by filter 20, magnet 132, and centrifuge 22 has reached a limiting point, all oil in tank 12 is extracted and delivered to a separate storage tank (not shown) for use as waste-oil furnace fuel. This may be conveniently accomplished by closing valve 52, opening valve 54, and using pump 24 to extract the oil from tank 12 and deliver it to the storage tank via conduit 33.

Before emptying the tank in this way, it is preferable to first close valve 48 and stop the pumping process, then replace the ten-mesh basket 120 of filter 20 with a similar basket having a one-hundred-mesh. Valve 48 can then be reopened, and pump 24 operated to empty tank 12, thereby passing oil from the tank through the fine-mesh filter once before the oil is delivered to the storage tank (FIG. 1, box 218). This precautionary filter step is usually sufficient to remove any fine particles which have not been captured by centrifuge 22 or magnet 132.

It will recognized by those familiar with the art to which the present invention pertains that this final fine-filtering step could be effected by adding a separate, additional mesh filter to apparatus 10, in a conduit arrangement by-passing filter 20. Suitable valve arrangements could be installed such that either filter could be placed in the flow-path of the waste-oil to the exclusion of the other.

The present invention has been described and depicted in terms of a preferred embodiment and other embodiments. The invention, however, is not limited by the embodiments described and depicted. Rather, the invention is limited only by the claims appended hereto.

I claim:

1. Apparatus for recovering combustible oil from waste-oil including non-oil fluids and solid contaminants, comprising:

a tank having a base and a top;

an inlet for admitting waste-oil to be recovered into said tank;

an outlet at the base of said tank for directly extracting from the apparatus any non-oil fluids which settle from waste-oil in said tank;

an oil cleaning arrangement connected with said tank for removing particulate material from oil circulated through said oil cleaning arrangement, said oil cleaning arrangement including a mesh filter and a centrifuge;

a pump for extracting oil from said tank, circulating said oil through said cleaning arrangement, and returning filtered and centrifuged oil to said tank; and said centrifuge having only one inlet sort and only one discharge port, said inlet port arranged to receive oil to be centrifuged and said outlet port connected with said tank such that all fluids discharged from said centrifuge are returned to said tank.

2. The apparatus of claim 1 further including a heater for heating waste-oil in said tank.

3. The apparatus of claim 1, wherein said pump and said cleaning arrangement are arranged such that oil is extracted from said tank at a point proximate the base thereof, passed first through said mesh filter, and returned to said tank at a point proximate the top thereof via said centrifuge.

4. The apparatus of claim 1 wherein said oil cleaning arrangement further includes a magnet for removing metallic particles from oil circulating therethrough.

5. The apparatus of claim 4, wherein said mesh filter is a basket formed from a mesh and said magnet is a permanent magnet removably located in said basket.

6. Apparatus for recovering combustible oil from waste-oil including liquid and solid contaminants, comprising:

a tank having a top and a base, said base being tapered toward an apex portion thereof;

an inlet for admitting waste-oil to be recovered into said tank, said;

an outlet at the apex portion of said tapered base for directly extracting from said tank any liquid contaminants which settle out of waste-oil contained therein;

a heater for heating any oil in said tank;

an oil cleaning arrangement outside of said tank for removing particulate material from oil passed through said oil cleaning arrangement, said oil cleaning arrangement including a mesh filter, a magnet located in said mesh filter for extracting metallic particles from said circulating oil, a centrifuge said centrifuge being the only centrifuge in the apparatus and having only one input port, said input port arranged to receive oil to be centrifuged and only one discharge port, said discharge port connected with said tank such that all fluids discharged from said centrifuge are returned to said tank, and a pump for circulating oil through said oil cleaning means, said pump having a suction side and a discharge side;

said mesh filter in fluid communication on one side thereof with said tank at a point proximate the base thereof and said mesh filter in fluid communication on an opposite side thereof with said pump on the suction side thereof;

said one discharge port of said centrifuge in fluid connection with said tank at a point thereon above a maximum level for liquid in the tank, and said input port of said centrifuge in fluid communication with said pump on the discharge side thereof; and said oil cleaning arrangement configured such that, when said tank contains waste-oil, said pump, when operating, causes oil to be extracted from said tank, drawn through said mesh filter and over said magnet therein, passed through said centrifuge, and discharged therefrom only back into said tank.

7. The apparatus of claim 6, wherein said tank is an elongated cylindrical tank, vertically oriented, and said base thereof is funnel-shaped.

8. The apparatus of claim 6 wherein said heater includes heating pads externally mounted in contact with the base of said tank.

* * * * *